United States Patent
Choi et al.

(10) Patent No.: US 7,671,951 B2
(45) Date of Patent: Mar. 2, 2010

(54) LIQUID CRYSTAL DISPLAY

(75) Inventors: Nak-Cho Choi, Seoul (KR); Ji-Won Sohn, Seoul (KR); Mee-Hye Jung, Suwon-si (KR); Ho-Yun Byun, Hwaseong-si (KR); Seon-Ah Cho, Busan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 509 days.

(21) Appl. No.: 11/567,006

(22) Filed: Dec. 5, 2006

(65) Prior Publication Data

US 2007/0258031 A1    Nov. 8, 2007

(30) Foreign Application Priority Data

Dec. 7, 2005    (KR)    ............. 10-2005-0118535

(51) Int. Cl.
G02F 1/1337    (2006.01)
G02F 1/1343    (2006.01)
(52) U.S. Cl. ............... 349/129; 349/144; 349/146
(58) Field of Classification Search ......... 349/144–146, 349/129
See application file for complete search history.

(56) References Cited

U.S. PATENT DOCUMENTS

| 6,288,763 | B1 | 9/2001 | Hirota |
| 6,603,526 | B2* | 8/2003 | Kim et al. ........... 349/141 |
| 6,614,497 | B2* | 9/2003 | Yamada ................ 349/129 |
| 6,724,452 | B1 | 4/2004 | Takeda et al. |
| 7,259,812 | B2* | 8/2007 | Park et al. ........... 349/106 |
| 2002/0001058 | A1* | 1/2002 | Wang ................... 349/129 |
| 2003/0231274 | A1 | 12/2003 | Wu |

FOREIGN PATENT DOCUMENTS

| JP | 11052381 | 2/1999 |
| JP | 2005010721 | 1/2005 |
| KR | 1020020039845 A | 5/2002 |
| KR | 1020050003262 A | 1/2005 |
| KR | 1020050058058 A | 6/2005 |
| KR | 1020050077571 A | 8/2005 |

* cited by examiner

*Primary Examiner*—Uyen-Chau N Le
*Assistant Examiner*—Chris H Chu
(74) *Attorney, Agent, or Firm*—F. Chau & Associates, LLC

(57) ABSTRACT

A liquid crystal display includes a plurality of pixel electrodes that are formed in a matrix shape and each of which includes at least two parallelogram electrode pieces each having a pair of lengthwise edges and a pair of oblique edges adjacent the lengthwise edges, and a common electrode that faces the pixel electrodes and that has tilt direction determining members. Transverse center lines of the pixel electrodes that are adjacent each other in a row direction alternate, and the tilt direction determining members that correspond to the pixel electrodes that are adjacent to each other in the row direction are connected to each other in the row direction.

18 Claims, 10 Drawing Sheets

LIQUID CRYSTAL DISPLAY

CROSS-REFERENCE TO RELATED APPLICATION

This application claims priority to and the benefit of Korean Patent Application No. 10-2005-0118535 filed in the Korean Intellectual Property Office on Dec. 7, 2005, the entire contents of which are incorporated herein by reference.

BACKGROUND OF THE INVENTION (a) Technical Field

The present disclosure relates to a liquid crystal display.

(b) Discussion of the Related Art

Liquid crystal displays (LCDs) are now widely used as flat panel displays in various kinds of electronic devices. A liquid display typically has two display panels on which field generating electrodes such as pixel electrodes and a common electrode are formed, and a liquid crystal (LC) layer that is interposed between the panels. The LCD generates an electric field in the LC layer by applying voltages to the electrodes, and obtains desired images by controlling the strength of the electric field for determining orientations of LC molecules and polarization of light incident on the LC layer to vary the transmittance of light incident on the LC layer.

The liquid crystal display further includes switching elements that are respectively connected to the pixel electrodes, and a plurality of signal lines such as gate lines, data lines, or the like, that control the switching elements to allow a voltage to be applied to the pixel electrodes.

Among these liquid crystal displays, a liquid crystal display of a vertically aligned (VA) mode has been spotlighted because it has a large contrast ratio and a wide reference viewing angle, in which long axes of the liquid crystal molecules are perpendicular to the upper and lower display panels in a state in which an electric field is not applied. In this case, the reference viewing angle refers to a viewing angle at which a contrast ratio is 1:10 or to a luminance inversion limit angle between grays.

As methods of achieving a wide viewing angle in a liquid crystal display of a vertically aligned mode, there are a method of forming a cutout in a field generating electrode, and a method of forming a protrusion above or below the field generating electrode. Since the cutouts and the protrusions determine a tilt direction of the liquid crystal molecules, the tilt direction of the liquid crystal molecules is decentralized by appropriately disposing the cutouts and the protrusions, thereby widening the reference viewing angle.

The cutouts or the protrusions decrease the aperture ratio, however. In order to increase the aperture ratio, a structure having an ultra-high aperture ratio has been suggested for increasing a size of the pixel electrode to its maximum value. In this case, however, since the distance between the pixel electrodes is short, a strong lateral field is generated between the pixel electrodes. Alignment of the liquid crystal molecules is the scattered due to this lateral field and, as a result, texture or light leakage occurs.

Furthermore, liquid crystal displays of a VA mode have poor lateral visibility as compared to a front visibility. For example, in a liquid crystal display of a patterned vertically aligned (PVA) mode, which is provided with the cutouts, images gradually become brighter in a lateral direction. In the worst case, a luminance difference between high grays does not exist and, thus, pictures may be viewed in a state in which they are broken up.

Therefore, exemplary embodiments of the present invention have been made in an effort to provide an electrode arrangement having advantages of reducing loss caused by texture and thus improving an aperture ratio and transmittance.

SUMMARY OF THE INVENTION

An exemplary embodiment of the present invention provides a liquid crystal display that includes a plurality of pixel electrodes that are formed in a matrix shape, in which each pixel electrode includes at least two parallelogram electrode pieces each having a pair of lengthwise edges and a pair of oblique edges adjacent to the lengthwise edges, and a common electrode that faces the pixel electrodes and has tilt direction determining members. Transverse center lines of the pixel electrodes, which are adjacent to each other in a row direction, alternate, and the tilt direction determining members that correspond to the pixel electrodes that are adjacent to each other in the row direction are connected to each other in the row direction.

The tilt direction determining members may include cutouts having oblique lines that are parallel to the oblique edges of the electrode pieces and connection portions extending from the oblique lines, while the connection portions and the oblique lines meet at a predetermined angle.

The connection portions may overlap boundary lines of the pixel electrodes that are adjacent to each other in the row direction.

The pixel electrodes may be formed of the two parallelogram electrode pieces that are adjacent to each other in the row direction, and the two parallelogram electrode pieces may be partially connected to each other.

The two parallelogram electrode pieces may be reversely symmetrical on the basis of a lengthwise center line of each of the pixel electrodes.

The liquid crystal display may further include a plurality of thin film transistors connected to a plurality of pixel electrodes, a plurality of gate lines connected to the plurality of thin film transistors, and a plurality of data lines that are connected to the plurality of thin film transistors and intersect the gate lines.

At least one of the data lines may extend and pass through a boundary line of the parallelogram electrode pieces.

At least one of the data lines may extend and pass through a boundary line of the pixel electrodes that are adjacent to each other in the row direction.

The gate lines may include first portions that do not overlap the pixel electrodes and second portions that do overlap the pixel electrodes.

The first portions may extend and pass through boundary lines of the pixel electrodes that are adjacent to each other in a column direction.

The gate lines may not overlap the pixel electrodes.

The liquid crystal display may further include an organic film formed between the data lines and the pixel electrodes.

The liquid crystal display may further include a plurality of color filters facing the plurality of pixel electrodes. The plurality of color filters face the plurality of pixel electrodes located on the same column, and they may have two different colors that are alternately disposed.

The liquid crystal display may further include a plurality of color filters facing the plurality of pixel electrodes, wherein the plurality of color filters that face the plurality of pixel electrodes located on the same column may have three different colors that are alternately disposed.

The plurality of color filters that face the pixel electrodes that are adjacent to each other in the row direction may have different colors.

The liquid crystal display may further include a gate driver connected to the gate lines, a data driver connected to the data lines, and a signal controller controlling the gate driver and the data driver. The signal controller rearranges image signals obtained by treating input image signals to apply output image signals to the data driver.

BRIEF DESCRIPTION OF THE DRAWINGS

Exemplary embodiments of the present invention will be understood in more detail from the following descriptions taken in conjunction in with attached drawings, in which.

DETAILED DESCRIPTION OF EXEMPLARY EMBODIMENTS

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

First, a liquid crystal display according to an exemplary embodiment of the present invention will be described in detail referring to FIGS. 1 and 2.

Figure 1:
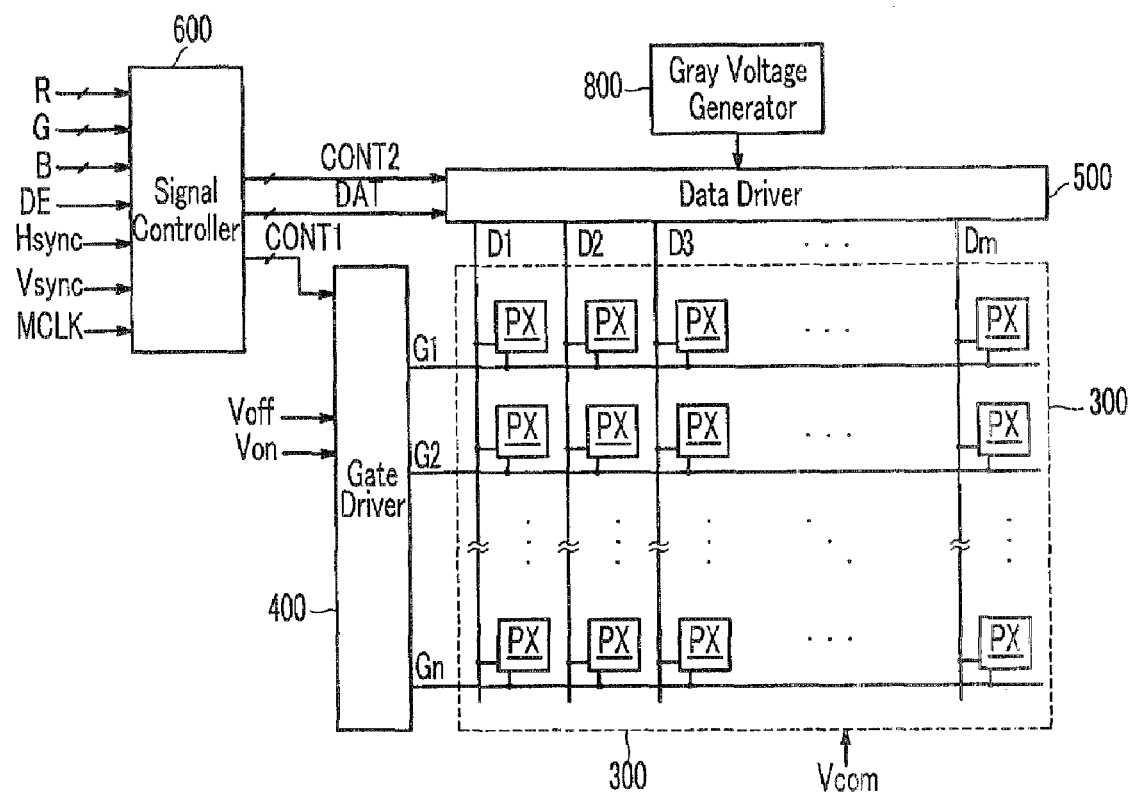
FIG. 1 is a block diagram of a liquid crystal display according to an exemplary embodiment of the present invention.
Figure 2:
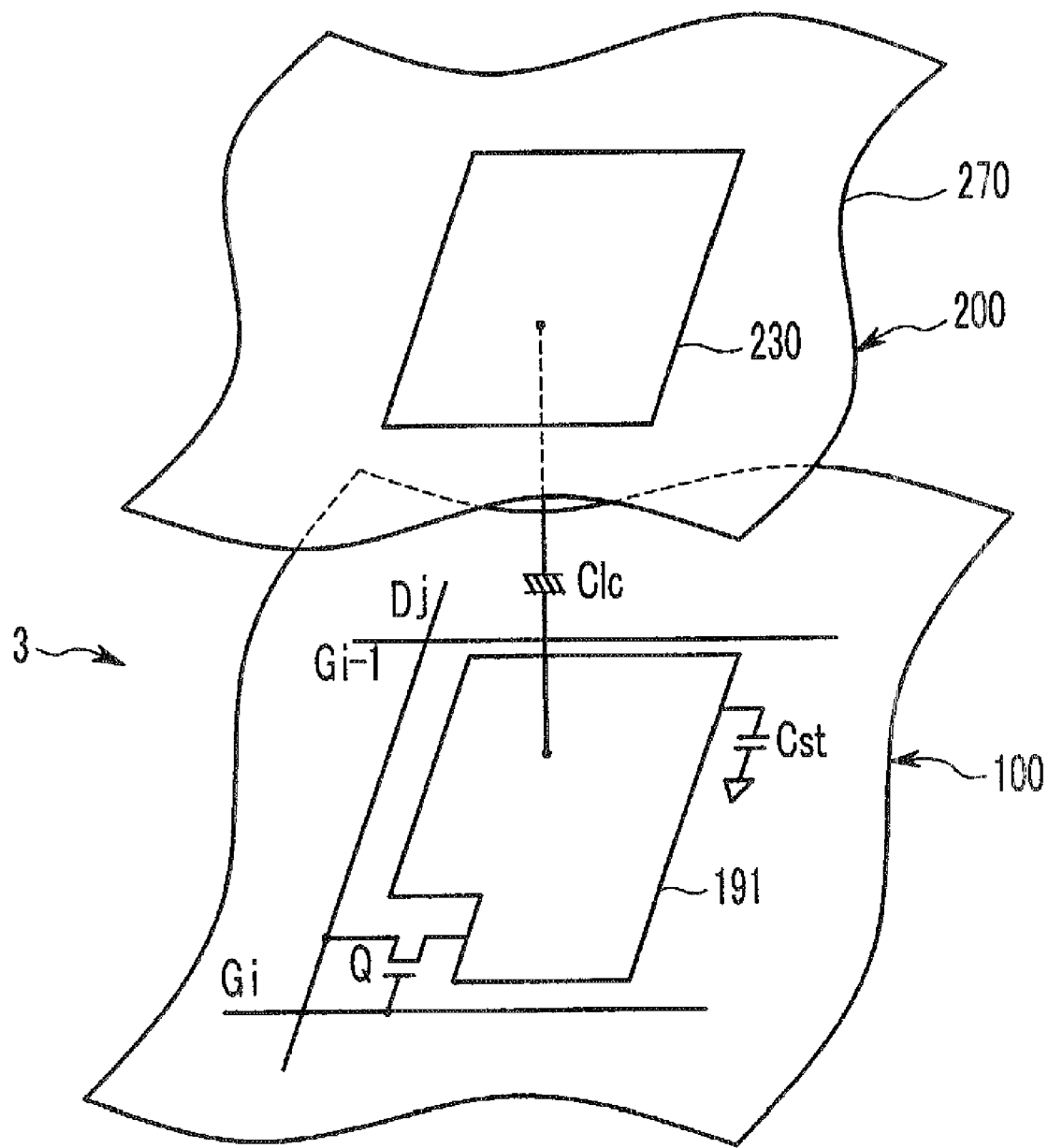
FIG. 2 is an equivalent circuit view of a pixel of the liquid crystal display according to an exemplary embodiment of the present invention.

FIG. 1 is a block diagram of the liquid crystal display according to an exemplary embodiment of the present invention, and FIG. 2 is an equivalent circuit view of a pixel of the liquid crystal display according to an exemplary embodiment of the present invention.

As shown in FIG. 1, the liquid crystal display includes a liquid crystal panel assembly 300, a gate driver 400 and a data driver 500 connected to the liquid crystal panel assembly 300, a gray voltage generator 800 connected to the data driver 500, and a signal controller 600 for controlling the elements of the liquid crystal display.

The liquid crystal panel assembly 300 also includes a plurality of signal lines $G_1$ to $G_n$ and $D_1$ to $D_m$ and a plurality of pixels PX that are connected to the signal lines and arranged in a matrix shape. Meanwhile, in the equivalent circuit of a pixel shown in FIG. 2, the liquid crystal panel assembly 300 includes a lower panel 100 and an upper panel 200 that face each other, and a liquid crystal layer 3 interposed therebetween.

The signal lines $G_1$ to $G_n$ and $D_1$ to $D_m$ have a plurality of gate lines $G_1$ to $G_n$ for transmitting gate signals (also referred to as "scanning signals"), and a plurality of data lines $D_1$ to $D_m$ for transmitting data signals. The gate lines $G_1$ to $G_n$ extend in a row direction so as to be substantially parallel to each other, and the data lines $D_1$ to $D_m$ extend in a column direction so as to be substantially parallel to each other.

Each of the pixels PX, for example the pixel PX that is connected to the i-th (where i=1, 2, ..., n) gate line $G_i$ and the j-th (where j=1, 2, ..., m) data line $D_j$, includes a switching element Q connected to the signal lines $G_i$ and $D_j$, a liquid crystal capacitor Clc connected to the switching element, and a storage capacitor Cst. The storage capacitor Cst may be removed if deemed necessary.

Each switching element Q corresponds to a three-terminal element, such as a thin-film transistor, provided in the lower panel 100, and has a control terminal connected to the gate line $G_i$, an input terminal connected to the data line $D_j$, and an output terminal connected to the liquid crystal capacitor Clc and the storage capacitor Cst.

The liquid crystal capacitor Clc uses a pixel electrode 191 of the lower panel 100 and the common electrode 270 of the upper panel 200 as its two terminals, and the liquid crystal layer 3 between the two electrodes 191 and 270 functions as the dielectric of the capacitor Clc. The pixel electrode 191 is connected to the switching element Q, and the common electrode 270 is formed on an entire surface of the upper panel 200 and is applied with common voltage Vcom. Unlike the structure shown in FIG. 2, the common electrode 270 may be alternatively formed on the lower panel 100. In this case, at least one of the two electrodes 191 and 270 may be formed in the shape of a wire or rod.

The storage capacitor Cst that supplements the liquid crystal capacitor Clc is formed by overlapping a separate signal line (not shown) and the pixel electrode 191, which are provided on the lower panel 100, with an insulator interposed therebetween. A predetermined voltage such as the common voltage Vcom is applied to the separate signal line (not shown). The storage capacitor Cst, however, may be formed by overlapping the pixel electrode 191 and a previous gate line with an insulator interposed therebetwen.

Each of the pixels PX specifically displays one of the primary colors (spatial division) or each of the pixels PX alternately displays the primary colors depending on a change of time (temporal division) to display a color, so that a desired color is displayed by spatial or temporal composition of the primary colors. Three primary colors including red, green, and blue may be exemplified as examples of the primary colors. FIG. 2 shows an example of the spatial division, in which each of the pixels PX includes a color filter 230 for displaying one of the primary colors in a region of the upper panel 200 corresponding to the pixel electrode 191. Unlike the structure shown in FIG. 2, the color filter 230 may be formed on or beneath the pixel electrode 191 of the lower panel 100.

At least one polarizer (not shown) for polarizing light is attached to the outer surface of the liquid crystal panel assembly 300.

Referring to FIG. 1 again, the gray voltage generator 800 generates a plurality of gray voltages (or reference gray voltages) related to the light transmittance of the pixels PX. The gray voltage generator 800, however, may generate only a given number of gray voltages (referred to as reference gray voltages) instead of generating all of the gray voltages.

The gate driver 400 is connected to the gate lines $G_1$ to $G_n$ of the liquid crystal panel assembly 300 and applies gate signals, which are formed by a combination of a gate-on voltage Von and a gate-off voltage Voff, to the gate lines $G_1$ to $G_n$.

The data driver 500 is connected to the data lines $D_1$ to $D_m$ of the liquid crystal panel assembly 300 and applies data voltages Vd, which are selected from the gray voltages supplied from the gray voltage generator 800, to the data lines, $D_1$ to $D_m$. When the gray voltage generator 800 does not provide voltages for all grayscales but provides only a predetermined number of reference gray voltages, however, the data driver 500 generates gray voltages for all grayscales by dividing the reference gray voltages and selects a data signal among the gray voltages for all grayscales.

The signal controller 600 controls the gate driver 400, the data driver 500, and the other circuits of the liquid crystal display.

Each of the driving devices and the controller 400, 500, 600, and 800 may be directly mounted on the liquid crystal panel assembly 300 in the form of at least one IC chip, or they may be mounted on a flexible printed circuit film (not shown) so as to be attached to the liquid crystal panel assembly 300 in the form of a TCP (tape carrier package), or they may be mounted on a separate printed circuit board (not shown). Unlike the above-mentioned structure, the driving devices 400, 500, 600, and 800 also may be integrated on the liquid crystal panel assembly 300 along with the signal lines $G_1$ to $G_n$ and $D_1$ to $D_m$ and the thin film transistor switching elements Q. Furthermore, the driving devices and the controller 400, 500, 600, and 800 may be integrated into a single chip. In this case, at least one of the drivers or at least one circuit element forming the drivers may be provided outside the single chip.

Hereinafter, an example of the liquid crystal panel assembly according to an exemplary embodiment of the present invention will be described in detail referring to FIGS. 3 to 7B.

Figure 3:
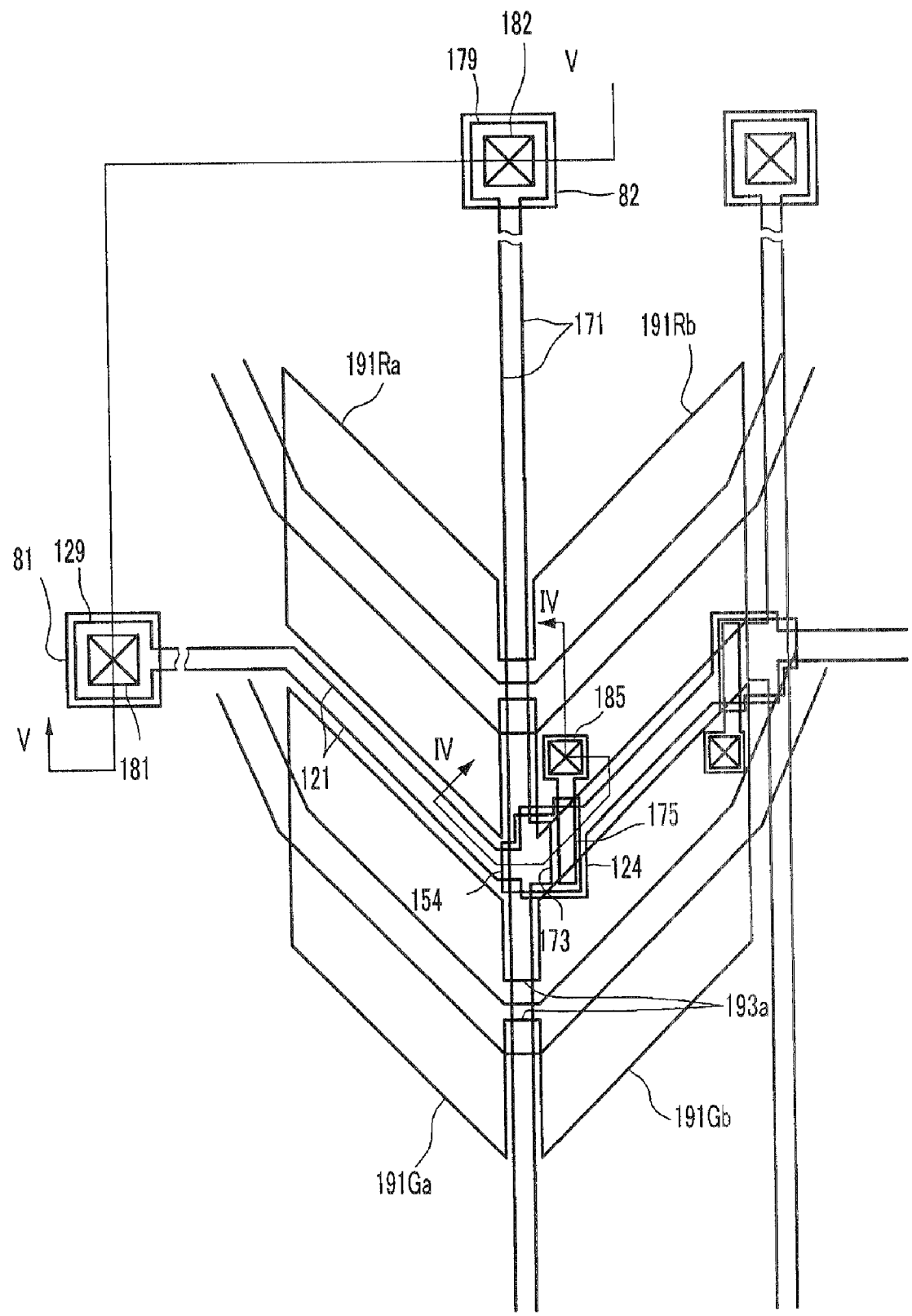
FIG. 3 is a layout view of the liquid crystal display according to an exemplary embodiment of the present invention.
Figure 4:
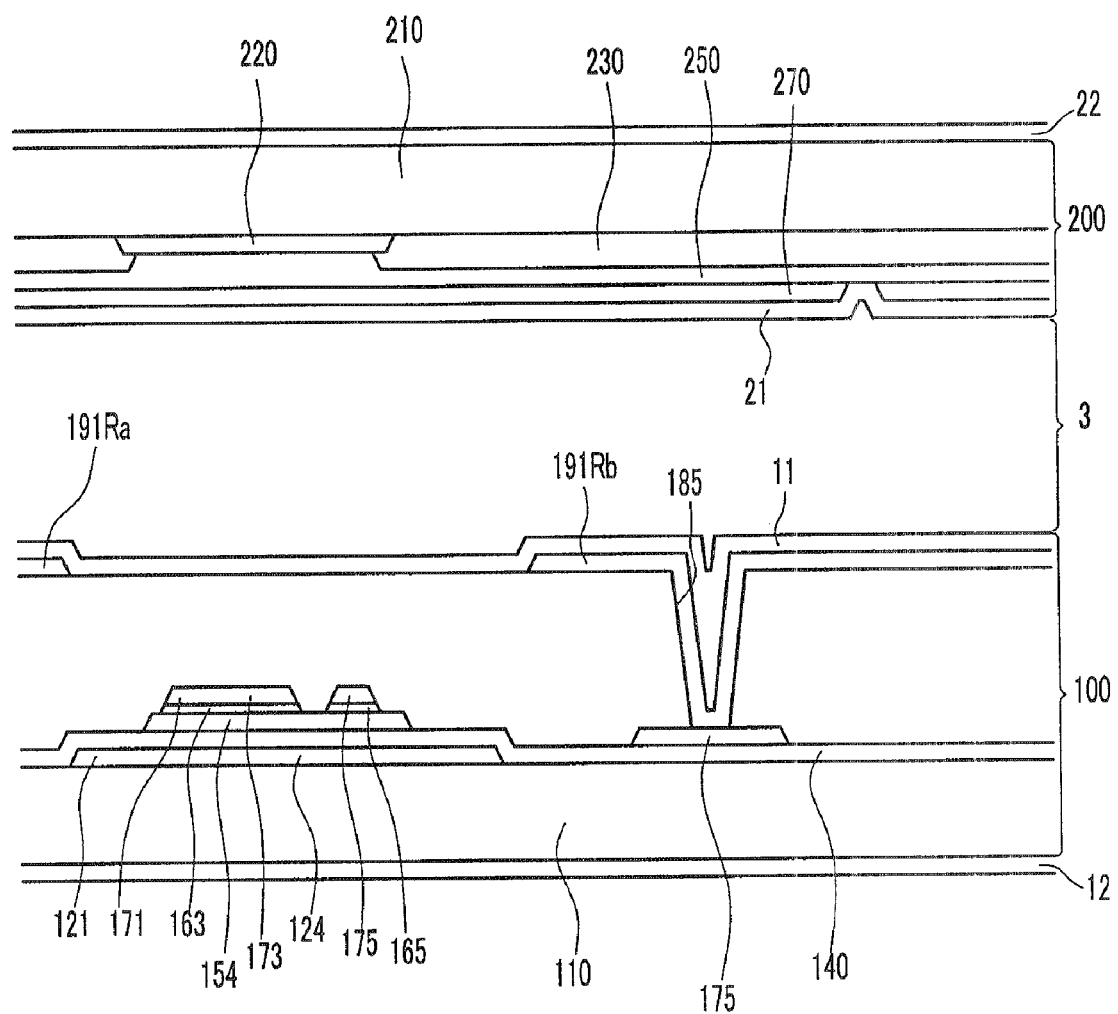
FIGS. 4 and 5 are cross-sectional views of the liquid crystal display shown in FIG. 3 taken along the lines IV-IV and V-V, respectively.
Figure 5:
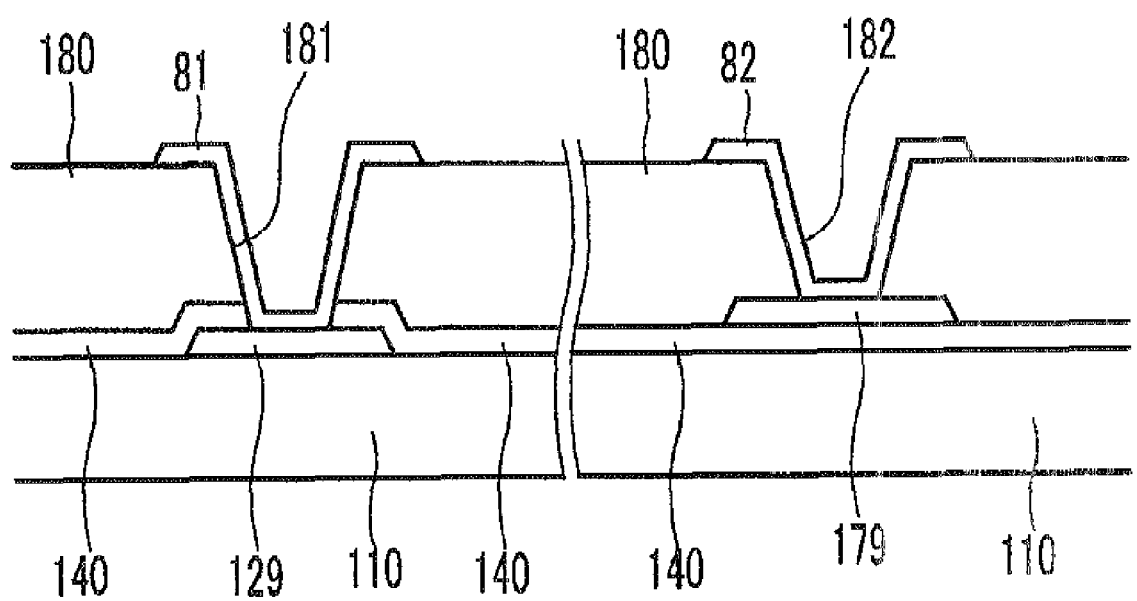

FIG. 3 is a layout view of the liquid crystal display according to an exemplary embodiment of the present invention, and FIGS. 4 and 5 are cross-sectional views taken along the lines IV-IV and V-V, respectively, in the liquid crystal display shown in FIG. 3.

Referring to FIGS. 3 to 5, the liquid crystal display according to an exemplary embodiment of the present invention includes a lower panel 100 and a upper panel 200 that face each other, and a liquid crystal layer 3 that is interposed between the two display panels 100 and 200.

First, the lower panel 100 will be described.

A plurality of gate lines 121 are formed on an insulation substrate 110 formed of transparent glass or plastic.

The gate lines 121 transmit gate signals, and extend in a transverse direction. Each of the gate lines 121 has a plurality of gate electrodes 124 that protrude upwardly, and an end portion 129 having a large area for connection with other layers and external driving circuits. When a gate driver 400 is integrated on the substrate 110, the gate lines 121 may extend so as to be directly connected to the gate driver circuit.

Each of the gate lines 121 may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal such as molybdenum (Mo) or a molybdenum alloy, chromium (Cr), tantalum (Ta), titanium (Ti), and the like. The gate conductor, however, may have a multilayer structure that has two conductive layers (not shown) with physical properties that are different from each other. In order to reduce signal delay or voltage drop, one of the two conductive layers is made of a metal having low resistivity, for example, an aluminum-based metal, a silver-based metal, a copper-based metal, or the like. Different from the one conductive layer, the other conductive layer is made of materials with excellent physical, chemical, and electrical contact characteristics, particularly, ITO (indium tin oxide) and IZO (indium zinc oxide), molybdenum-based metal, chromium, tantalum, titanium, and the like. Preferable examples of material configurations of the two conductive layers may include a chromium lower layer and an aluminum (alloy) upper layer, and an aluminum (alloy) lower layer and a molybdenum (alloy) upper layer. Each of the gate lines 121, however, may be made of not only the above-mentioned materials, but also of various other metals or conductors.

The side of each of the gate lines 121 is inclined relative to a surface of the substrate 110, and the preferable inclination angle thereof ranges from about 30 degrees to about 80 degrees.

A gate insulating layer 140 preferably made of silicon nitride (SiNx) or silicon oxide (SiOx) is formed on the gate conductor 121.

A plurality of semiconductor islands 154, which are formed of hydrogenated amorphous silicon, amorphous silicon is hereinafter simply referred to as a-Si, or polysilicon, are formed above the gate insulating layer 140. The semiconductor islands 154 are located above the gate electrodes 124.

A pair of ohmic contact islands (ohmic contacts) 163 and 165 are formed above the semiconductor islands 154. Each of the ohmic contacts 163 and 165 may be made of a material such as n+ hydrogenated amorphous silicon, in which n-type impurities, such as phosphor, are doped with a high concentration, or made of a material such as silicide.

The sides of the semiconductor 154 and the ohmic contacts 163 and 165 are inclined with respect to the surface of the substrate 110, and the inclined angle is within a range of 30 to 80°.

A plurality of data conductors including a plurality of pairs of data lines 171 and a plurality of pairs of first and second drain electrodes 175 are formed on the ohmic contacts 163 and 165 and the gate insulating layer 140.

The data lines 171 transmit data signals, and extend in a longitudinal direction to cross the gate lines 121. Each of the data lines 171 includes a plurality of pairs of source electrodes 173 that extend to the gate electrodes 124, and an end portion 179 having a large area for connection with the other layers or the data driver 500. When the data driver 500 is integrated on the substrate 110, the data line 171 may extend to be directly connected to the data driver 500.

The drain electrodes 175 are separated from the data lines 171, and face the source electrodes 173 are based on the gate electrodes 124.

A single gate electrode 124, a single source electrode 173, and a single drain electrode 175 form a single thin film transistor (TFT) together with a semiconductor 154, and a channel of the thin film transistor is formed in the semiconductor 154 between the source electrode 173 and the drain electrode 175.

Each of the data conductors 171 and 175 is preferably made of refractory metals, such as molybdenum, chromium, tantalum, and titanium, or an alloy thereof, or may have a multilayer structure that includes a refractory metal film (not shown) and a conductive layer (not shown) having low resistance. Examples of the multilayer structure include a double layer having a chromium or molybdenum (alloy) lower layer and an aluminum (alloy) upper layer, and a triple layer having a molybdenum (alloy) lower layer, an aluminum (alloy) intermediate layer, and a molybdenum (alloy) upper layer. The data conductors 171 and 175, however, may be made of not only the above-mentioned materials, but also of various other metals or conductors.

The sides of the data conductors 171 and 175 are also preferably inclined to the surface of the substrate 110 at an angle of 30 to 80°.

The ohmic contacts 163 and 165 exist only between the semiconductor 154 below the ohmic contacts 163 and 165 and the data conductors 171 and 175 above the ohmic contacts 163 and 165, so as to reduce the contact resistance between them. In the semiconductor 154, exposed regions exist between the source electrodes 173 and the drain electrodes 175, as well as exposed portions that are not covered with the data conductors 171 and 175.

A passivation layer 180 is formed on the data conductors 171 and 175 and the exposed portions of the semiconductor 154. The passivation layer 180 may be made of an inorganic insulator or an organic insulator and may have a flat surface. Preferably, the organic insulator has a dielectric constant of 4.0 or less, and may have photosensitivity. The passivation layer 180, however, may have a dual-layer structure including a lower inorganic layer and an upper organic layer, so that it does not damage the exposed portions of the semiconductor 154, while sufficiently employing the excellent insulating characteristic of an organic film.

In the passivation layer 180, are formed a plurality of contact holes 182 and 185 to which an end 179 of the data line 171 and ends of the first and second drain electrodes 175 are exposed, and formed in the passivation layer 180 and the gate insulating layer 140 are a plurality of contact holes 181 to which ends 129 of the gate lines 121 are exposed.

On the passivation layer 180, a plurality of pixel electrodes 191 and a plurality of contact assistants 81 and 82 are formed. Each of the pixel electrodes 19 and the contact assistants 81 and 82 may be made of a transparent conductive material such as ITO or IZO, or a reflective metal such as aluminum, silver, chromium, or an alloy thereof.

Hereinafter, shapes of the pixel electrodes 191 according to an exemplary embodiment of the present invention will be described referring to FIGS. 6A, 6B, 7A, and 7B.

Figure 6A:
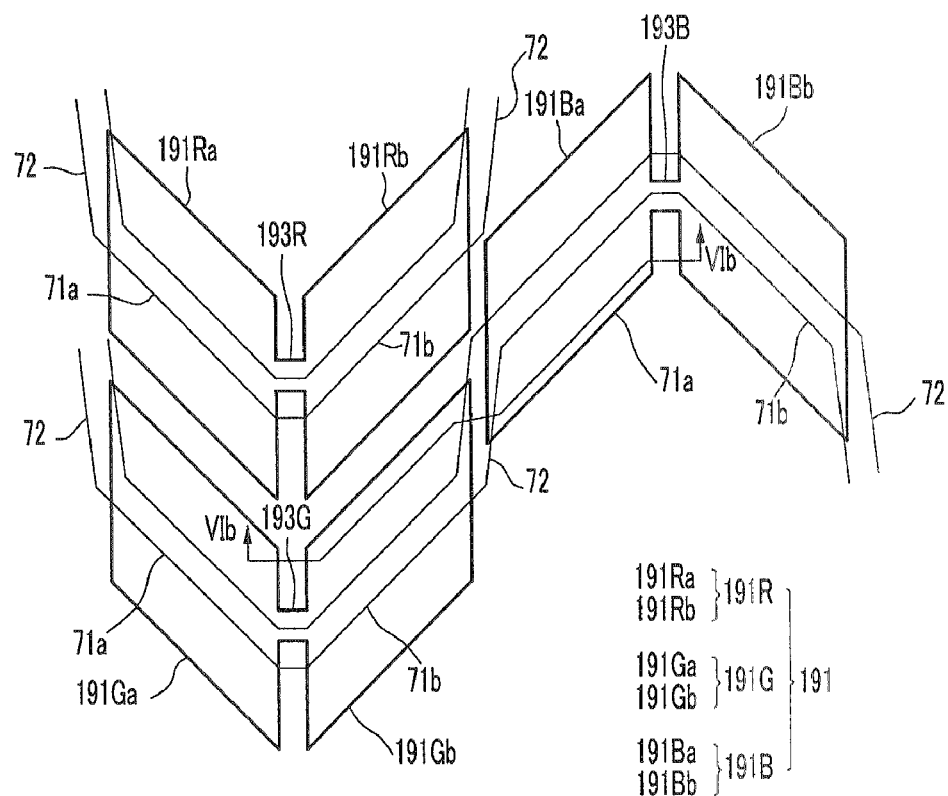
FIG. 6A is a layout view showing a pixel electrode and a common electrode of the liquid crystal display according to an exemplary embodiment of the present invention.
Figure 6B:
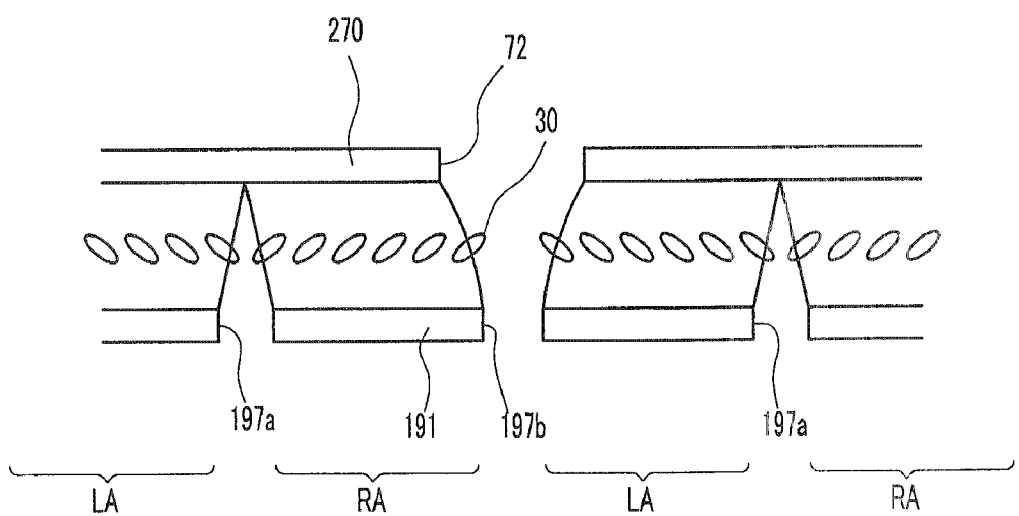
FIG. 6B is a cross-sectional view taken along the line VIb-VIb in the liquid crystal display shown in FIG. 6A.
Figure 7A:
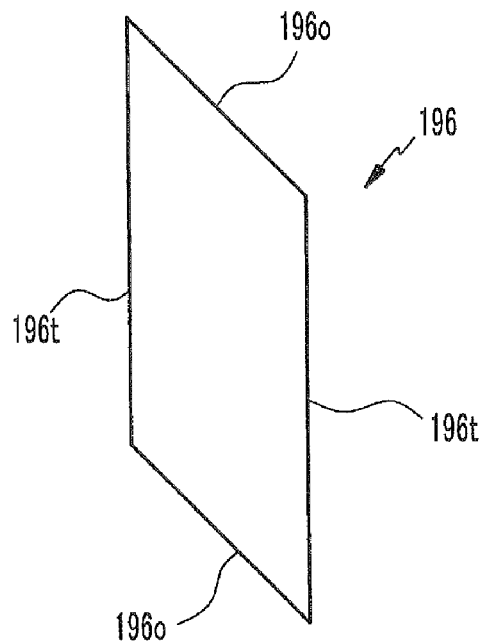
FIGS. 7A and 7B are plan views illustrating electrode pieces as basic units of the pixel electrode in the liquid crystal display according to an exemplary embodiment of the present invention.
Figure 7B:
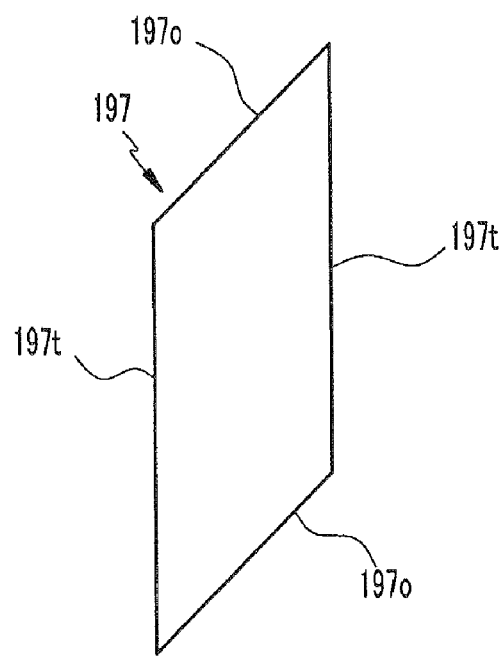

FIG. 6A is a layout view showing a pixel electrode and a common electrode of the liquid crystal display according to an exemplary embodiment of the present invention, FIG. 6B is a cross-sectional view taken along the line VIb-VIb of FIG. 6A, and FIGS. 7A and 7B are plan views illustrating electrode pieces as basic units of the pixel electrode in the liquid crystal display according to an exemplary embodiment of the present invention.

As shown in FIGS. 6A and 6B, each of the pixel electrodes of the liquid crystal panel assembly according to an exemplary embodiment of the present invention includes first parts 191Ra, 191Ga, and 191Ba formed on the left of the lengthwise center line, and second parts 191Rb, 191Gb, and 191Bb formed on the right of the lengthwise center line. The common electrode 270 (see FIG. 2) has cutouts 71a, 71b, and 72 that face the pixel electrodes 191.

Each of the first and the second parts 191Ra, 191Ga, 191Ba, 191Rb, 191Gb, and 191Bb of the pixel electrode 191 includes one parallelogram electrode piece 196 shown in FIG. 7A and one parallelogram electrode piece 197 shown in FIG. 7B.

As shown in FIGS. 7A and 7B, each of the electrode pieces 196 and 197 has a pair of oblique edges 196o and 197o and a pair of lengthwise edges 196t and 197t, and each of the electrode pieces 196 and 197 is substantially a parallelogram. Each oblique edge 196o and 197o forms an oblique angle with respect to the lengthwise edges 196t and 197t, and the oblique angle is preferably within a range of 45 to 135°. Hereinafter, for convenience sake, the shape of the electrode piece 196 and 197 is classified according to the direction of inclination ("inclination direction") from a perpendicular state with respect to the lengthwise edges 196t and 197t, and it is referred to as "left-inclined" when the inclination direction is leftward as shown in FIG. 7A and as "right-inclined" when the inclination direction is rightward as shown in FIG. 7B.

The length between the lengthwise edges 196t and 197t of the electrode pieces 196 and 197, that is, the width, and the distance between the oblique edges 196o and 197o, that is, the height, may be determined freely in accordance with the size of the LC panel assembly 300. Also, the lengthwise edges 196t and 197t of each electrode piece 196 and 197 may be modified, for example, may be curved or projected, in consideration of the relationships with other parts, which modification may be included when referring to a parallelogram hereinafter.

In the pixel electrodes 191, the parallelogram electrode pieces 196 and 197, which have different inclinations, are partially connected to each other through connection bridges 193a (see FIG. 3), 193R, 193G and 193B in a row direction. The lengthwise edges 196t and 197t of the parallelogram electrode pieces 196 and 197 are in contact with each other. The oblique edges 196o and 197o of the parallelogram electrode pieces 196 and 197 are connected to each other to form an oblique angle, and the oblique angle is preferably about 90°. A such, the pixel electrodes 191 are bent once in a horizontal direction, and are bilaterally symmetrical with the lengthwise center line as the central figure.

The two pixel electrodes 191R and 191G that are adjacent each other in a column direction have lengthwise edges 196t and 197t on a straight line. That is, virtual lines that bisect the pixel electrodes 191R and 191G into left and right sides (hereinafter, referred to as "lengthwise center line") are arranged in a straight line. Virtual lines that bisect the pixel electrodes 191R and 191G into upper and lower sides (hereinafter, referred to as "transverse center line") are not located on the straight line in the two pixel electrodes 191R and 191B that are adjacent to each other in the row direction. An upper oblique edge of the pixel electrode 191B is located at a middle portion of the lengthwise edge of the neighboring pixel electrode 191R. That is, the pixel electrodes 191R and 191B that are adjacent each other in the row direction are alternately arranged in the vertical direction.

In the common electrode 270, cutouts 71a, 71b, and 72 are formed to face the electrode pieces 196 and 197, and the electrode pieces 196 and 197 are divided into two sub-areas with the cutouts 71a, 71b, and 72 as the central figure. The cutouts 71a, 71b, and 72 include oblique lines 71a and 71b that are parallel to the oblique edges 196o and 197o of the electrode pieces 196 and 197, and connection portions 72 that extend to meet the oblique lines 71a and 71b at an obtuse angle. The oblique lines 71a and 71b of the cutouts that are formed in the common electrodes 270 facing the pixel electrodes 191R and 191B that are adjacent in the row direction are connected through the connection portions 72. That is, the cutouts 71a, 71b, and 72 of the common electrodes 270 are connected to each other in the single pixel row.

The connection portions 72 of the cutouts overlap the boundary line of the pixel electrodes 191R and 191B that are adjacent each other in the row direction, and the widths of the connection portions 72 are larger than those of the pixel electrodes 191R and 191B that are adjacent each other in the row direction.

In FIGS. 3 to 7B, the position and the angled direction of the pixel electrodes 191 may be changed, and the pixel electrodes 191 of FIGS. 3 to 7B may be symmetrically shifted in the horizontal or vertical direction or rotated to achieve the change in direction.

Each pixel electrode 191 is physically and electrically connected through the contact hole 185 to the drain electrode 175, and the data voltage is applied from the drain electrode 175 to the pixel electrode. The pixel electrode 191 to which the data voltage is applied generates an electric field along with the common electrode 270 of the upper panel 200 to which the common voltage is applied, thereby determining the direction of liquid crystal molecules 30 of the liquid crystal layer 3 between the two electrodes 191 and 270. The variation of the polarization of the light passing through the liquid crystal layer 3 is different according to the direction of the liquid crystal molecules 30 that is determined as described above. The pixel electrode 191 and the common electrode 270 form a capacitor, referred to above as the "liquid crystal capacitor", and it holds an applied voltage even after the thin film transistor is turned off.

The contact assistants 81 and 82 are connected to the ends 129 of the gate lines 121 and ends 179 of the data lines 171 through the contact holes 181 and 182. The contact assistants 81 and 82 complement connection between the ends 129 of the gate lines 121 and the ends 179 of the data lines 171 and an external device, and serve to protect them.

Next, the upper panel 200 will be described.

The light blocking member 220 is formed on an insulation substrate 210 that is made of transparent glass or plastic. The light blocking member 220 may have a bent portion (not shown) that corresponds to a bent edge of the pixel electrode 191 and a quadrangle portion (not shown) that corresponds to the thin film transistor. The light blocking member 220 prevents light leakage between the pixel electrodes 191 and defines an opening region that faces the pixel electrode 191.

On the substrate 210 and the light blocking member 220, a plurality of color filters 230 are formed. The color filters 230 mainly exist in a region surrounded by the light blocking member 220, and may extend to be elongated along a column of the pixel electrodes 191. Each of the color filters 230 may display one of three primary colors including red, green, and blue.

An overcoat 250 is formed on the color filter 230 and the light blocking member 220. The overcoat 250 may be made of an organic insulator, prevents the color filter 230 from being exposed, and provides a flat surface. The overcoat 250 may be omitted if desired.

The common electrode 270 is formed on the overcoat 250. The common electrode 270 is formed of a transparent conductor, such as ITO, IZO, or the like, and has a plurality of cutouts (not shown).

Alignment layers 11 and 21, which may be vertical alignment layers, are formed on inner surfaces of the display panels 100 and 200 facing the liquid crystal layer 3.

Polarizers 12 and 22 shown in FIG. 4 are provided on outer surfaces of the display panels 100 and 200. Preferably, the polarization axes of the two polarizers are orthogonal to each other, and form an angle of about 45° with respect to the oblique edges of the pixel electrodes 191. In a case of a reflective liquid crystal display, one of the two polarizers may be omitted.

The liquid crystal display may include a lighting unit or backlight unit (not shown) that supplies light to the polarizers 12 and 22, a phase delay film, the display panels 100 and 200, and the liquid crystal layer 3.

The liquid crystal layer 3 has negative dielectric anisotropy, and long axis of the liquid crystal molecules of the liquid crystal layer 3 are perpendicular to the surfaces of the two display panels in the absence of an electric field.

The liquid crystal panel assembly including a plurality of pixel electrodes shown in FIG. 3 will be described in detail referring to FIGS 8 and 9.

Figure 8:
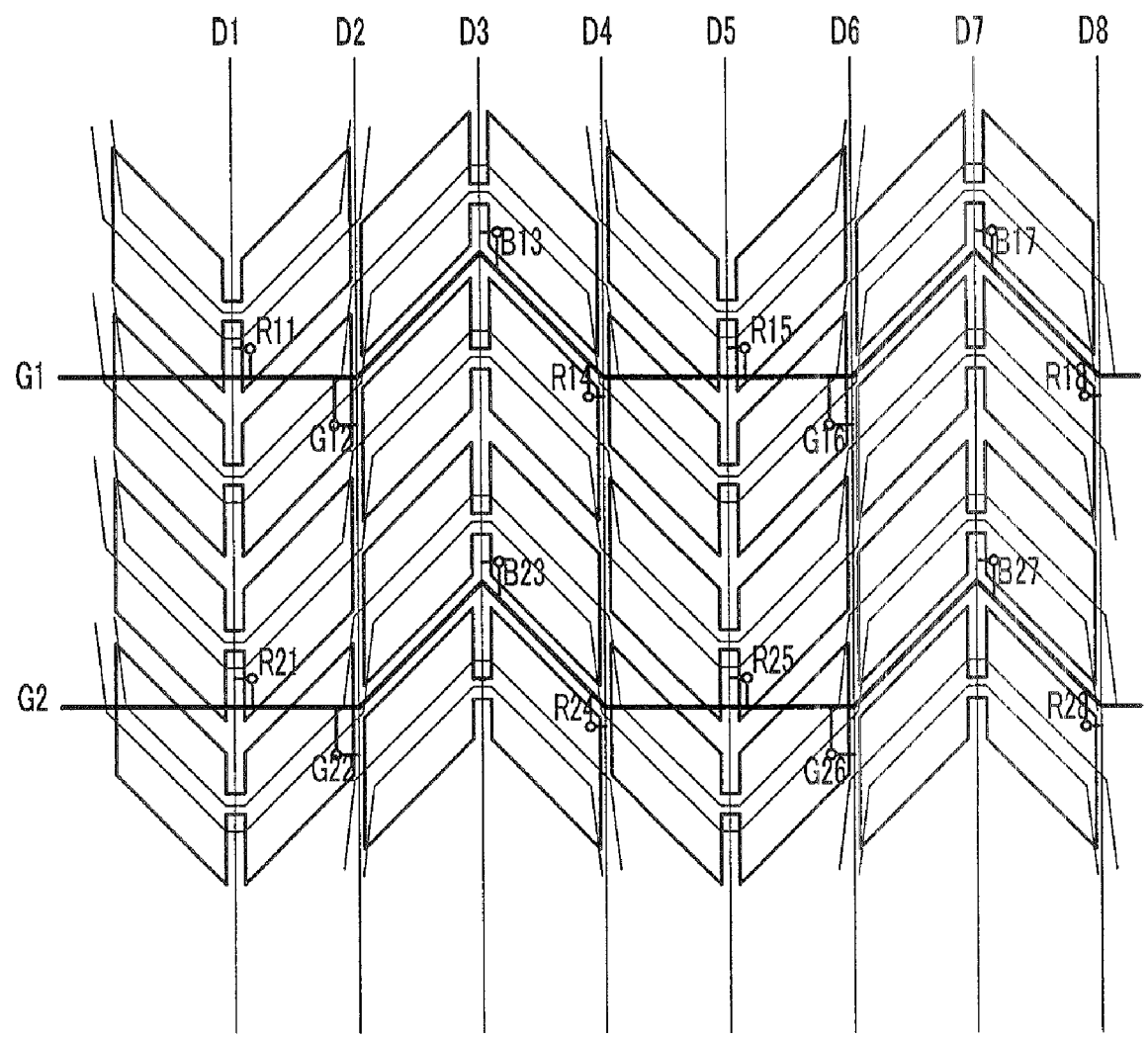
FIG. 8 illustrates an arrangement of the pixel electrode, the common electrode, and a signal line of the liquid crystal display according to an exemplary embodiment of the present invention.

FIG. 8 illustrates arrangement of the pixel electrode, the common electrode, and a signal line of the liquid crystal display according to the exemplary embodiment of the present invention.

In FIG. 8, virtual lines that bisect the pixel electrodes 191 of FIG. 3, which are adjacent each other in the row direction, into upper and lower sides (hereinafter, referred to as "transverse center line") are not located on the same straight line. The pixel electrodes 191 that are adjacent each other in the row direction are reversely symmetrical in the vertical direction. The shapes of the pixel electrodes 191 that are adjacent in the column direction are identical with each other, and the lengthwise center lines of the pixel electrodes 191 are on the same straight line.

Meanwhile, a portion of the gate lines G1 and G2 overlaps the pixel electrodes 191, while another portion does not overlap the pixel electrodes 191.

Further, a portion of the data lines D1, D3, D5, D6, and D7 extends over the lengthwise center line of the pixel electrode 191 to bisect the pixel electrode, while another portion of the data line D2, D4, D6, and D8 extends while passing through the boundary line of the pixel electrodes 191 that are adjacent in the row direction.

Two color filters 230 shown in FIG. 2 of different colors alternately extend along that pixel electrodes 191 that are adjacent in the column direction. In FIG. 8, the pixels are designated by Rij, Gij, or Bij. R denotes the pixel having the red color filter 230, G denotes the pixel having the green color filter 230, B denotes the pixel having the blue color filter 230, i means that the pixel is connected to the i-th gate line 121, and j means that the pixel is connected to the j-th data line 171. In the liquid crystal panel assembly of FIG. 8, the pixels R11 and R21 having the red color filter are sequentially connected to the first data line D1, the pixels G12 and G22 having the green color filter are sequentially connected to the second data line D2, and the pixels B13 and B23 having the blue color filter are sequentially connected to the third data line D8. This rule is repeated with respect to the data lines D4, D5, D6, D7, and D8.

An arrangement of the pixel electrodes of the liquid crystal panel assembly according to an exemplary embodiment of the present invention will be described referring to FIG. 9.

Figure 9:
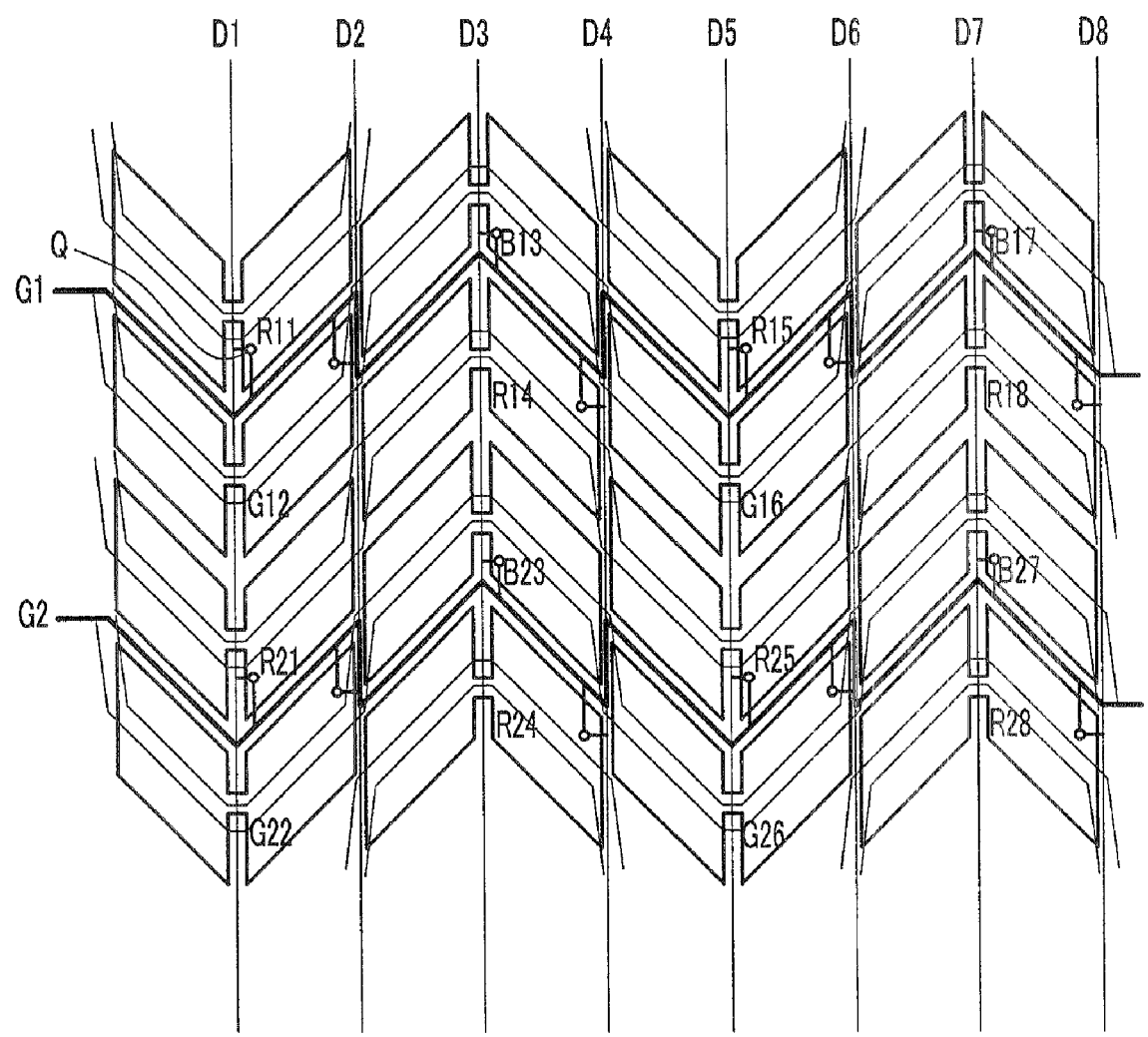
FIG. 9 illustrates an arrangement of a pixel electrode, a common electrode, and a signal line of a liquid crystal display according to an exemplary embodiment of the present invention.

FIG. 9 illustrates arrangement of the pixel electrode, the common electrode, and the signal line of the liquid crystal display according to an exemplary embodiment of the present invention.

The pixel electrode 191 and the common electrode 270 shown in FIG. 2 of the liquid crystal panel assembly of FIG. 9 have the same shapes as those of the liquid crystal panel assembly of FIG. 8. Unlike what is shown in FIG. 8, since the gate line 121 is bent a few times so as to extend while passing through the boundary line of the pixel electrodes 191 that are adjacent in the column direction, the gate line 121 and the pixel electrode 191 do not overlap each other in the exemplary embodiment of FIG. 9. Accordingly, a parasitic capacitance is prevented from occurring between the gate line 121 and the pixel electrode 191.

The operation of the liquid crystal display will now be described in detail referring back to FIG. 1.

The signal controller 600 receives input image signals R, G, and B from an external graphics controller (not shown), and input control signals for controlling the display of the input image signals R, G, and B. The input image signals R, G, and B have luminance information regarding the pixel PX, and the luminance has a predetermined number of grays, for example, the luminance has 1024 ($=2^{10}$), 256 ($=2^8$), or 64 ($=2^6$) grays. Examples of the input control signal include a vertical synchronization signal Vsync, a horizontal synchronizing signal Hsync, a main clock signal MCLK, and a data enable signal DE.

The signal controller 600 appropriately processes the input image signals R, G, and B and the input control signals, so that the input image signals R, G, and B correspond to operating conditions of the liquid crystal panel assembly 300 and the data driver 500, and generates gate control signals CONT1, data control signals CONT2, and the like. Then, the signal controller 600 transmits the gate control signals CONT1 to the gate driver 400, and transmits the data control signals CONT2 and the processed image signals DAT to the data driver 500. An output image signal DAT has a predetermined number of values (or grays) formed as a digital signal.

Each of the gate control signals CONT1 includes a scanning start signal for instructing the start of scanning, and at least one clock signal for controlling the output period of the gate-on voltage Von. In addition, the gate control signal CONT1 may further include an output enable signal E for limiting the duration of the gate-on voltage Von.

Each of the data control signals CONT2 includes a horizontal synchronization start signal for directing the start of transmitting image data to a group of subpixels, and a load signal and a data clock signal for causing the data signals to be applied to the liquid crystal panel assembly 300. In addition, each of the data control signals CONT2 may further include an inversion signal for inverting the voltage polarity of the data signal for the common voltage Vcom, hereinafter, "the voltage polarity of the data signal for the common voltage" is briefly referred to as "the polarity of the data signal".

The data driver 500 converts the digital image signals DAT into analog data signals by receiving the digital image signals DAT for a group of subpixels, and selecting respective gray voltages corresponding to the digital image signals DAT on the basis of the data control signals CONT2 from the signal controller 600. Then, the data driver 500 applies the analog data signals to the corresponding data lines.

The gate driver 400 turns on the switching elements connected to the gate lines by applying the gate-on voltage V on to the gate lines on the basis of the gate control signal CONT1 from the signal controller 600. Accordingly, the data signals applied to the data lines are applied to the corresponding pixels through the switching elements that are turned on.

If a potential difference is generated across the liquid crystal capacitors Clc shown in FIG. 2, a primary electric field that is substantially perpendicular to the surfaces of the display panels 100 and 200 is generated in the liquid crystal layer 3. Hereinafter, all of the electrodes 191 and the common electrode 270 are referred to as "field generating electrodes". Then, long axes of the liquid crystal molecules of the liquid crystal layer 3 are perpendicular to a direction in which the electric field is applied in response to the applied electric field, and the variation of the polarization of the light incident on the liquid crystal layer 3 is different according to the inclination of the liquid crystal molecules. When the polarization varies, the light transmittance is changed by the polarizer and, thus, the liquid crystal display displays images.

Tilt directions of the liquid crystal molecules are primarily determined according to horizontal components obtained by distorting the primary electric field by the cutouts 71a, 71b, and 72 of the field generating electrodes 191 and 270 and the edges of the pixel electrodes 191. The horizontal components of this primary electric field are substantially perpendicular to the edges of the cutouts 71a, 71b, and 72 and the edges of the pixel electrodes 191.

The pixel electrodes 191 are divided into a plurality of sub-areas by the cutouts 71a, 71b, and 72, and each of the sub-areas has two major edges that are defined by oblique lines of the cutouts 71a, 71b, and 72 and oblique edges of the pixel electrodes 191. The liquid crystal molecules on each sub-area are tilted in directions perpendicular to the major edges, that is, in substantially four directions. As such, as the tilt directions of liquid crystal molecules are diversified, a reference viewing angle of the liquid crystal display is increased.

A direction of a secondary electric field that is secondarily generated by the voltage difference between the pixel electrodes 191 is perpendicular to the major edges of the sub-areas. Therefore, a direction of the secondary electric field is that of the direction of the horizontal component of the primary electric field. As a result, the secondary electric field between the pixel electrodes 191 determines the tilt direction of the liquid crystal molecules.

In the liquid crystal display according to an exemplary embodiment of the present invention, the electric field formed between the common electrode 270 and the pixel electrode 191 corresponds to a curved line of FIG. 6B. Accordingly, the liquid crystal molecules move substantially perpendicularly with respect to the curved line. As shown in FIGS. 6A and 6B, if the cutout 72 of the common electrode 270 overlaps the gap 197b between the pixel electrodes 191, and the cutout 72 of the common electrode 270 is larger than the gap 197b between the pixel electrodes 191, the liquid crystal molecules 30 are tilted in a predetermined direction. Furthermore, the liquid crystal molecules 30 are tilted in a predetermined direction due to the electric field formed between the gap 197a between the two electrode pieces 196 and 197 and the common electrode. Therefore, as shown in FIG. 6B, the liquid crystal molecules 30 are tilted in the same direction between the gap 197a between the two electrode pieces 196 and 197 of the pixel electrode 191 and the gap 197b between the pixel electrodes 191. That is, in a first region RA, the liquid crystal molecules 30 are tilted to the right, and, in a second region LA, the liquid crystal molecules 30 are tilted to the left. Accordingly, since the liquid crystal molecules 30 are unidirectionally tilted in one region, it is possible to prevent the occurrence of texture that is caused by disordered directions of the liquid crystal molecules.

Hereinafter, the liquid crystal panel assembly according to an exemplary embodiment of the present invention will be described in detail referring to FIG. 10.

Figure 10:
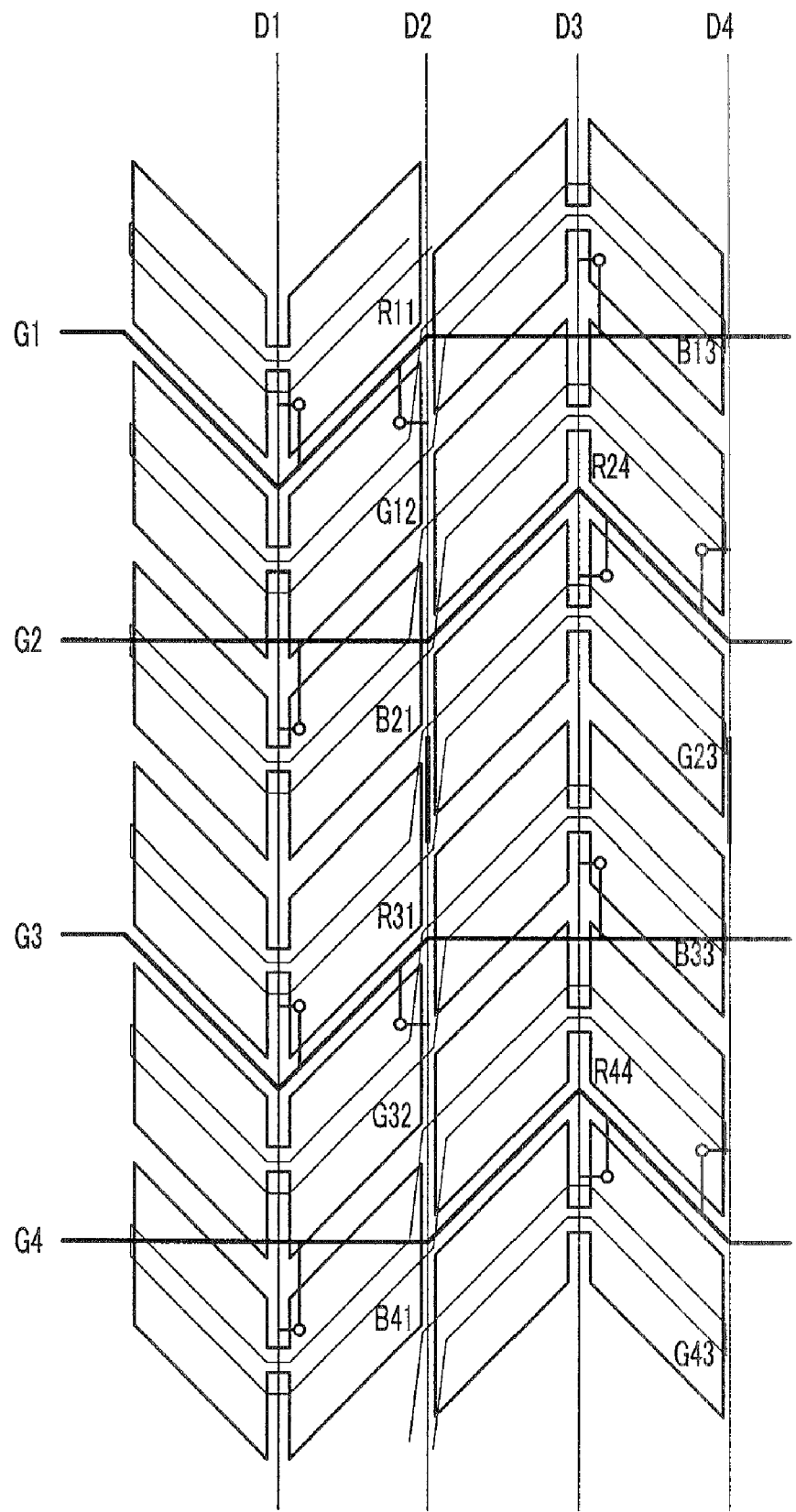
FIG. 10 illustrates an arrangement of a pixel electrode, a common electrode, and a signal line of a liquid crystal display according to an exemplary embodiment of the present invention.

FIG. 10 is a layout view showing the liquid crystal panel assembly according to an exemplary embodiment of the present invention.

In the liquid crystal panel assembly of FIG. 10, the arrangement of pixel electrodes 191 and common electrodes 270 is the same as that of FIG. 8. The liquid crystal panel assembly of FIG. 10, however, has different types of arrangements of the color filter 230, unlike what is shown in FIG. 8. That is, the three color filters having different colors of the color filter 230 alternately extend along the pixel electrodes 191 that are adjacent in the column direction. Like FIG. 8 in which the pixels are designated by Rij, Gij, or Bij, R denotes the pixel having the red color filter 230, G denotes the pixel having the green color filter 230, B denotes the pixel having the blue color filter 230, i means that the pixel is connected to the i-th gate line 121, and j means that the pixel is connected to the j-th data line 171. In the liquid crystal panel assembly of FIG. 10, the pixel R11 having the red color filter, the pixel B21 having the blue color filter, and the pixel R32 having the red color filter are sequentially connected to the first data line D1. The pixel G12 having the green color filter and the pixel G32 having the green color filter are sequentially connected to the second data line D1, and the pixel B13 having the blue color filter, the pixel G23 having the green color filter, the pixel B33 having the blue color filter, and the pixel G43 having the green color filter are sequentially connected to the third data line D3. That is, the pixels having the same color filter are not connected to the single data line, but the pixels having the different color filters are connected to the single data line.

Accordingly, in the signal controller 600, it is necessary for image signals to be rearranged according to the order of the color filters connected to the single data line if the image signals are obtained by treating R, G, and B input image signals. When image signals are stored in a buffer part (not shown) in the signal controller 600, the image signals may be appropriately rearranged and outputted.

According to exemplary embodiments of the present invention, since disadvantages caused by texture of a liquid crystal display are avoided, it is possible to improve an aperture ratio and transmittance.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
    a plurality of pixel electrodes formed in a matrix shape, each pixel electrode includes at least two parallelogram electrode pieces each having a pair of lengthwise edges and a pair of oblique edges adjacent to the lengthwise edges; and
    a common electrode that faces the plurality pixel electrodes and has tilt direction determining members,
    wherein transverse center lines of the respective pixel electrodes that are adjacent to each other in a row direction are alternate, and
    the tilt direction determining members that correspond to the pixel electrodes that are adjacent to each other in the row direction are connected to each other in the row direction.

2. The liquid crystal display of claim 1, wherein the tilt direction determining members include cutouts having oblique lines that are substantially parallel to the oblique edges of the electrode pieces and connection portions that are bent from the oblique lines.

3. The liquid crystal display of claim 2, wherein the connection portions overlap boundary lines of the pixel electrodes that are adjacent to each other in the row direction.

4. The liquid crystal display of claim 2, wherein the connection portions linearly extend between the oblique lines.

5. The liquid crystal display of claim 2, wherein a width of the connection portions is wider than an interval between the pixel electrodes adjacent to each other.

6. The liquid crystal display of claim 1, wherein each of the two parallelogram electrode pieces that are adjacent to each other in the row direction and the two parallelogram electrode pieces are connected to each other.

7. The liquid crystal display of claim 6, wherein the two parallelogram electrode pieces are reversely symmetrical on a basis of a lengthwise center line of each of the plurality of pixel electrodes.

8. The liquid crystal display of claim 7, wherein at least one of a plurality of data lines is extended while passing through a boundary line of the parallelogram electrode pieces.

9. The liquid crystal display of claim 1, further comprising:
    a plurality of thin film transistors respectively connected to the plurality of pixel electrodes;
    a plurality of gate lines respectively connected to the plurality of thin film transistors; and
    a plurality of data lines respectively connected to the plurality of thin film transistors and being arranged to intersect the plurality of gate lines.

10. The liquid crystal display of claim 9, wherein at least one of the plurality of data lines is extended while passing through a boundary line of the pixel electrodes that are adjacent to each other in the row direction.

11. The liquid crystal display of claim 9, wherein each of the plurality of gate lines include a first portion that does not overlap the pixel electrodes and a second portion that does overlap the pixel electrodes.

12. The liquid crystal display of claim 11, wherein the first portion is extended while passing through boundary lines of the plurality of pixel electrodes that are adjacent to each other in a column direction.

13. The liquid crystal display of claim 9, wherein the plurality of gate lines do not overlap the plurality of pixel electrodes, respectively.

14. The liquid crystal display of claim 9, further comprising an organic film formed between the plurality of data lines and the plurality of pixel electrodes.

15. The liquid crystal display of claim 9, further comprising:
    a gate driver connected to the plurality of gate lines;
    a data driver connected to the plurality of data lines, and
    a signal controller controlling the gate driver and the data driver, wherein the signal controller rearranges image signals obtained by treating input image signals to apply output image signals to the data driver.

16. The liquid crystal display of claim 1, further comprising a plurality of color filters respectively facing the plurality of pixel electrodes,
    wherein the plurality of color filters that face the plurality of pixel electrodes are located in a same column direction and have two different colors that are alternately disposed.

17. The liquid crystal display of claim 16, wherein the plurality of color filters that respectively face the plurality of pixel electrodes adjacent to each other in a row direction display the two different colors.

18. The liquid crystal display of claim 1, further comprising a plurality of color filters respectively facing the plurality of pixel electrodes,
    wherein the plurality of color filters that face the plurality of pixel electrodes are located in a same column direction and have three different colors that are alternately disposed.

* * * * *